US006623580B2

(12) United States Patent
McMahon et al.

(10) Patent No.: US 6,623,580 B2
(45) Date of Patent: Sep. 23, 2003

(54) METHOD OF CURING FOAM INFLATED TIRES AND AN IMPROVED RIM

(75) Inventors: Brian Ernest McMahon, Akron, OH (US); George Wiley Lang, Titusville, FL (US); Larry Dean Tucker, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 253 days.

(21) Appl. No.: 09/853,165

(22) Filed: May 10, 2001

(65) Prior Publication Data

US 2002/0166223 A1 Nov. 14, 2002

(51) Int. Cl.[7] .............................................. B29D 30/04
(52) U.S. Cl. ..................... 156/79; 152/310; 156/112; 156/113; 264/46.6
(58) Field of Search ................. 156/112, 113, 156/78, 79; 264/46.4, 46.6, 46.9; 152/310, 323–329

(56) References Cited

U.S. PATENT DOCUMENTS

| 3,022,810 | A | | 2/1962 | Lambe ..................... 152/157 |
| 3,381,735 | A | | 5/1968 | Talcott et al. ............. 152/313 |
| 3,872,201 | A | | 3/1975 | Paul et al. .................. 264/55 |
| 3,907,018 | A | * | 9/1975 | Fujikawa et al. ........... 152/310 |
| 4,197,893 | A | | 4/1980 | O'Coin .................... 152/310 |
| 4,378,749 | A | * | 4/1983 | Leblanc et al. ............ 152/310 |
| 4,529,367 | A | | 7/1985 | Fike .......................... 425/17 |
| 4,550,827 | A | | 11/1985 | Watts et al. ............... 206/304 |
| 4,623,010 | A | | 11/1986 | Takahashi .................. 152/450 |
| 4,734,232 | A | | 3/1988 | Hoesman ................... 264/46.6 |
| 4,900,095 | A | | 2/1990 | Brubaker ................. 301/63 PW |
| 4,909,972 | A | | 3/1990 | Britz ........................ 264/51 |
| 5,186,676 | A | | 2/1993 | Morton .................... 446/465 |
| 5,343,916 | A | | 9/1994 | Duddey et al. ............... 152/5 |
| 5,733,015 | A | | 3/1998 | Demarest et al. ........... 301/5.3 |
| 5,942,068 | A | | 8/1999 | Adams et al. ............. 156/112 |
| 6,170,545 | B1 | | 1/2001 | Kobayashi et al. ......... 152/157 |

FOREIGN PATENT DOCUMENTS

| JP | 57007707 | 1/1982 |
| JP | 10272908 | 10/1998 |
| WO | WO 99/39929 | 8/1999 |

* cited by examiner

*Primary Examiner*—Geoffrey L. Knable
(74) *Attorney, Agent, or Firm*—David L. King

(57) ABSTRACT

A method for expanding and curing formable elastomeric material 2, which is placed in the cavity 14 of a previously molded tire 10, is disclosed. The tire 10 when filled with foamable rubber material 2 is mounted on a curing rim 20 and contacted with heat to simultaneously foam and cure the elastomeric material 2 within the tire cavity 14. The curing rim 20 has a finished or a coated surface 30 that permits the cured foam filled tire 10 to be removed after curing by slipping the cured tire 10 off the coated surface 30 of the curing rim 20.

1 Claim, 5 Drawing Sheets

METHOD OF CURING FOAM INFLATED TIRES AND AN IMPROVED RIM

BACKGROUND OF THE INVENTION

This invention is especially suitable for producing fill inflated tires used in on road trucks and earth moving equipment which have historically used pneumatic tires of the tube or tubeless type. Pneumatic tires are susceptible to punctures and blowouts and must be removed and repaired when such incidents happen. Unfortunately the use of equipment is lost for a period of time necessary for making the repairs. This is costly and expensive. Tires inflated with foamed elastomeric material however, are literally deflation proof and almost indestructible from normal hazards such as bolts and nails thus eliminating or substantially reducing the period of time the equipment is not in operation.

One such tire used in such applications is filled with a foamable material called Permafoam™. The Goodyear Tire and Rubber Company patented this material in U.S. Pat. No. 3,872,201 issued Mar. 18, 1975. In that patent a method of curing the foam inflated tires was disclosed, wherein, the tire was at least partially filled with the material and vulcanized in such a way that the foamable elastomeric material would expand thereby filling the entire air chamber cavity of the tire and pressing against the curing rim. In the prior art, the curing rim was also the same rim that was used on the vehicle.

The use of the vehicles rim meant that the customer had to ship rims to a manufacturing site to have Permafoam™ filled tires prepared. Once the rims and tires were assembled and cured, they would then be shipped back to the customer. This meant that the customer had to have duplicate sets of rims for each vehicle. This was both costly and inefficient. But it was determined that the tires could not easily be removed from the curing rim, and therefore, the most logical approach was to cure the tire on the rim that it was intended to be used on. The present invention has an objective of enabling a Permafoam™ cured tire or any foam filled tire to be cured and then subsequently removed from the rim for shipping to the customer. Another objective of the present invention is to enable storage of rimless Permafoam™ tires so that they can be available at the user site. Another objective is to provide a method, which ensures that the foam is not damaged during removal of the curing rim or during insertion onto the vehicle rim.

SUMMARY OF THE INVENTION

An improved method for expanding and curing foamable elastomeric material, which is placed in the cavity of the previously molded tire, is disclosed. The method has the steps of at least partially filling the cavity of the previously molded tire with foamable elastomeric material, curing the foam filled tire and removing the cured tire from the curing rim by slipping the cured tire off a finished or coated surface on the curing rim.

Once the tire is cured, the method further comprises the step of wrapping the cured tire for storage and shipment with a protective layer. Once the tire is shipped to the customer, the method then comprises the steps of removing the protective layer attaching a coated insertion cap or an insertion cone, or a combination insertion cap and insertion cone to the wheel rim abutting the cured foam filled tire, inserting the capped or cone and wheel rim into the cured foam filled tire and pressing the insertion cap or insertion cone against the cured foam filled tire sufficient to slip the tire onto the rim.

The rim for curing the previously molded tire with foamable elastomeric material has an exterior surface; the exterior surface has a coated surface for slipping the cured tire from the rim. The coating surfaces of the rim can be selected from the group including, McLube 1711C, waterless Pam grill sprays, baked on coatings like DYN-OH-COAT 100, or Teflon-S PTFE or Teflon-S FEP.

BRIEF DESCRIPTION OF THE DRAWINGS

The invention will be described by way of example and with reference to the accompanying drawings in which.

DEFINITIONS

"Foam Filled Tire" means a tire having an interior cavity filled with foamable elastomeric material.

"Foamable Elastomeric Material" means any material made of a heat curable material that is elastomeric having a rubber or synthetic base that upon curing expands increasing in volume, one such material by way of example being Permafoam™ sold by the Goodyear Tire and Rubber Company.

A DETAILED DESCRIPTION OF THE INVENTION

Figure 1:
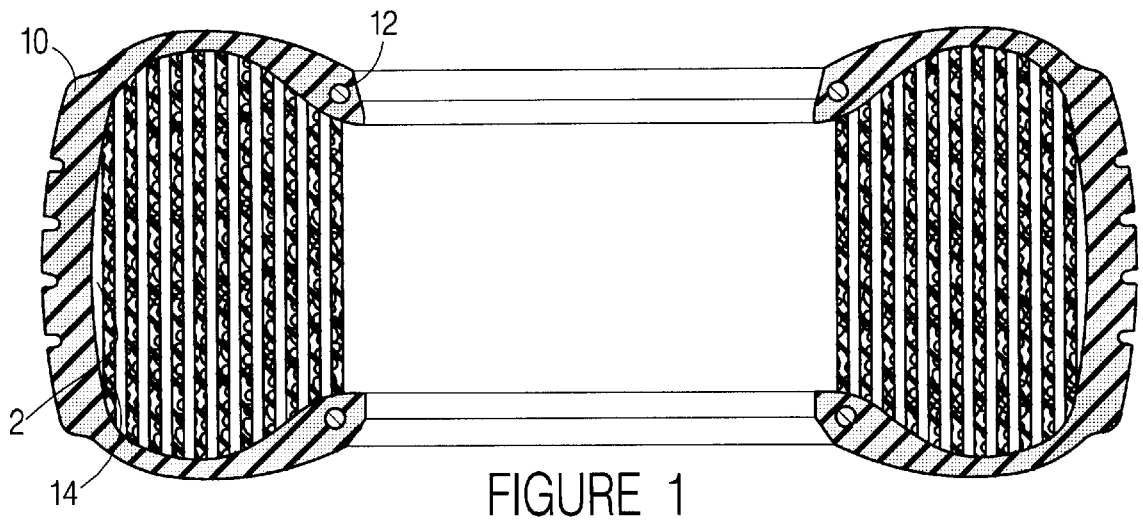
FIG. 1 is a cross sectional view of a foam filled tire prior to curing.

With reference to FIG. 1, a tire is shown with layers of foamable elastomeric material 2 in an uncured state shown inserted into the interior cavity of the tire. The foamable elastomeric material for exemplary purposes is to which is applied in layers that are pressed into the tire 10 and wound until the cavity 14 is substantially filled. Generally, the uncured foamable elastomeric material 2 lies substantially radically in the interior of the tire cavity 14 and in the uncured state is generally is not extended outside the tire cavity 14 as is illustrated in FIG. 1.

Figure 2:
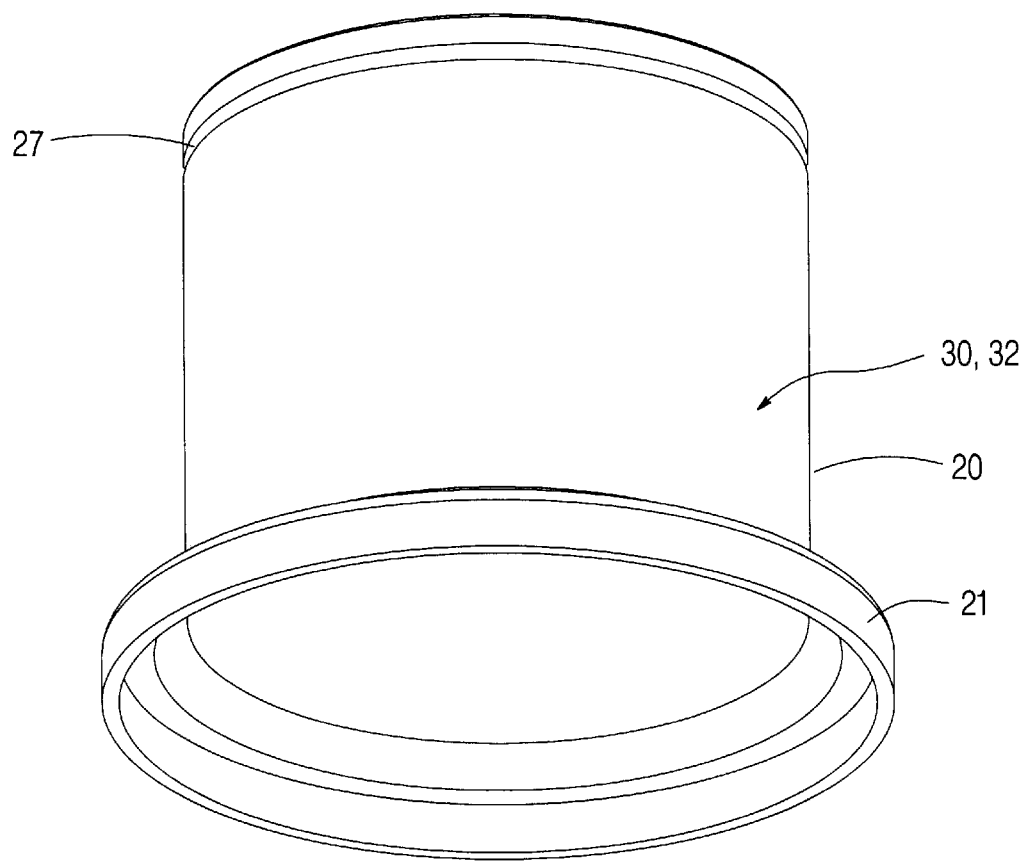
FIG. 2 is a perspective view of the curing rim.

The curing rim 20 as shown in FIG. 2 has a coated exterior surface 30 treated with a coating 32 that is designed to withstand the high cure temperatures and abrasion of the foamable elastomeric material 2 and provides a surface from which the cured tire 10 can be slipped off the curing rim 20 once the formable elastomeric material 2 is completely cured.

Figure 3:
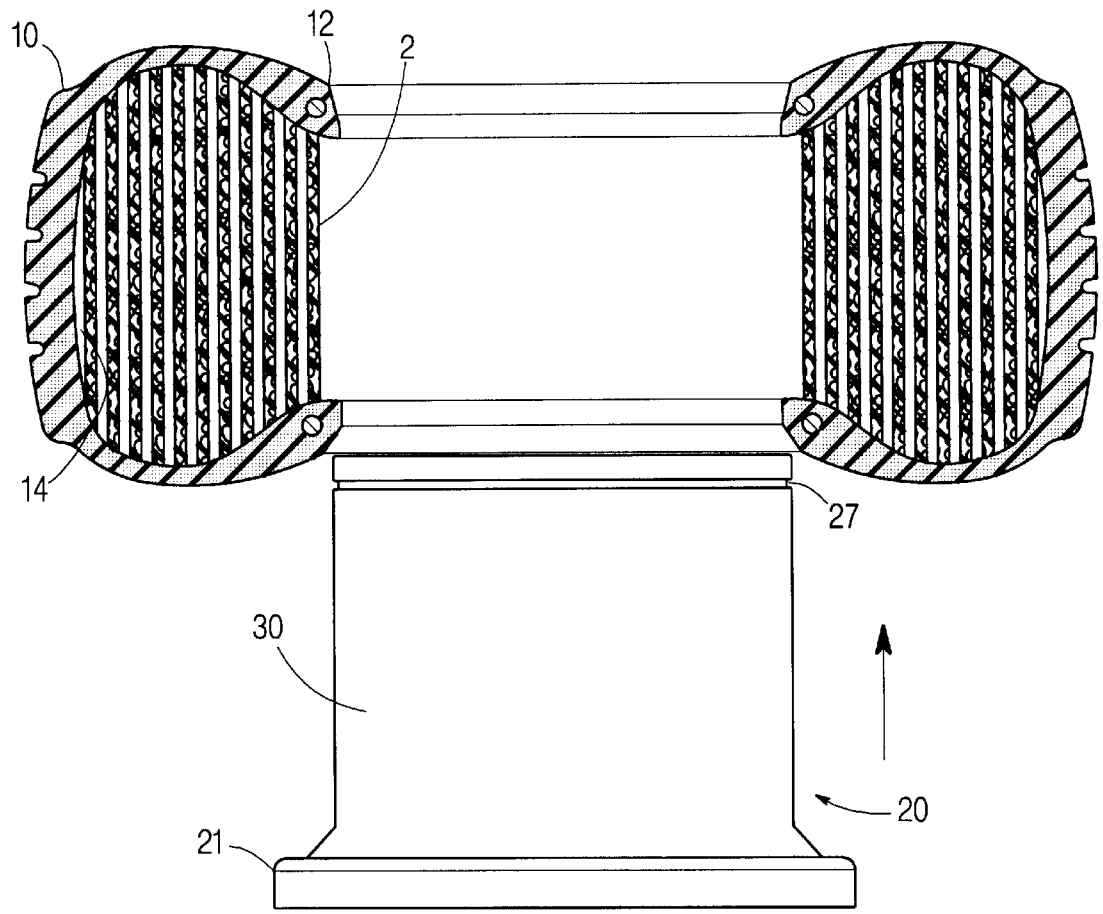
FIG. 3 is a view of the tire with foam being press fitted over the curing rim.
Figure 4:
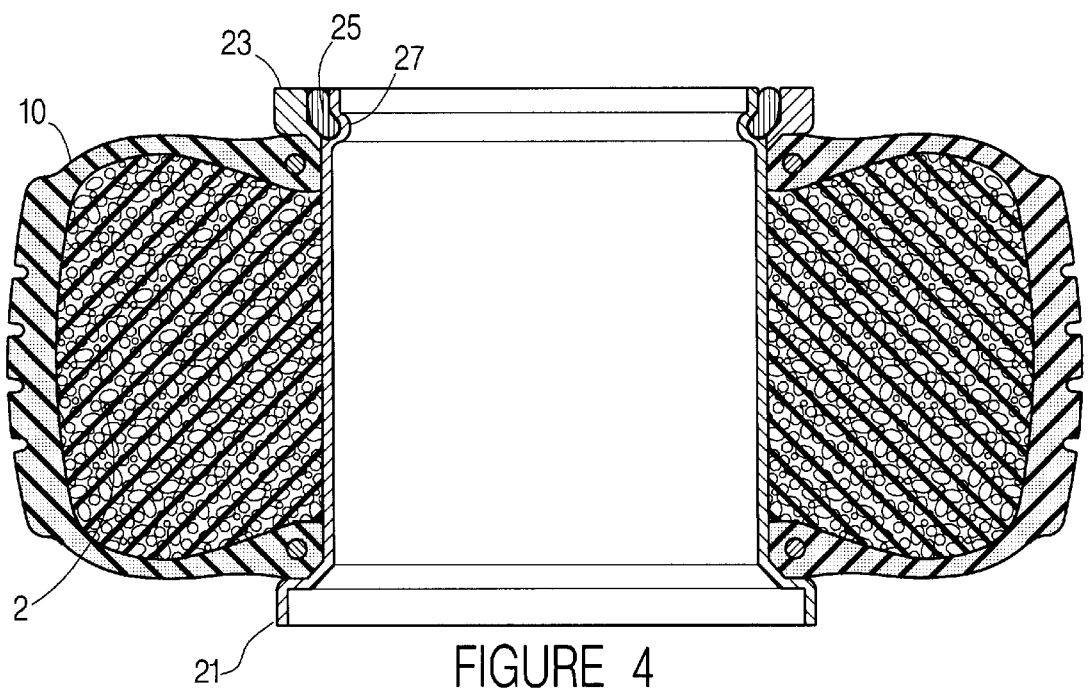
FIG. 4 illustrates the tire being restrained by flanges on the curing rim wherein the foam has been cured and expanded

With reference to FIG. 3, the curing rim 20 is shown being pressed into and through the tire 10. The tire 10 will slip onto the curing rim 20 until it abuts against the flange 21. Once the tire 10 is fully inserted, a second removable flange 23 and lock ring 25 is inserted into the groove 27 of the curing rim 20 as illustrated in FIG. 4. Once restrained in this fashion, the entire assembly is placed in a curing medium and cured at an elevated temperature. As further illustrated in FIG. 4, the layers of foamable elastomeric material 2 now become a homogenous of mixture of expandable foam completely filling the interior cavity 14 of the tire 10 and pressing firmly against the curing rim 20. Once the curing process is completed, the removable flange 23 and lock ring 25 are removed and a filler ring 33 can be slipped into the rim groove 27. The filler ring 33 simply occupies the rim groove 27 and is flushed to the exterior surface 30 so that as the tire 10 is slipped off the rim 20 the cured foam material 2 does not catch an edge and tear. The filler ring is removed as soon as the tire is off the rim.

Figure 5:
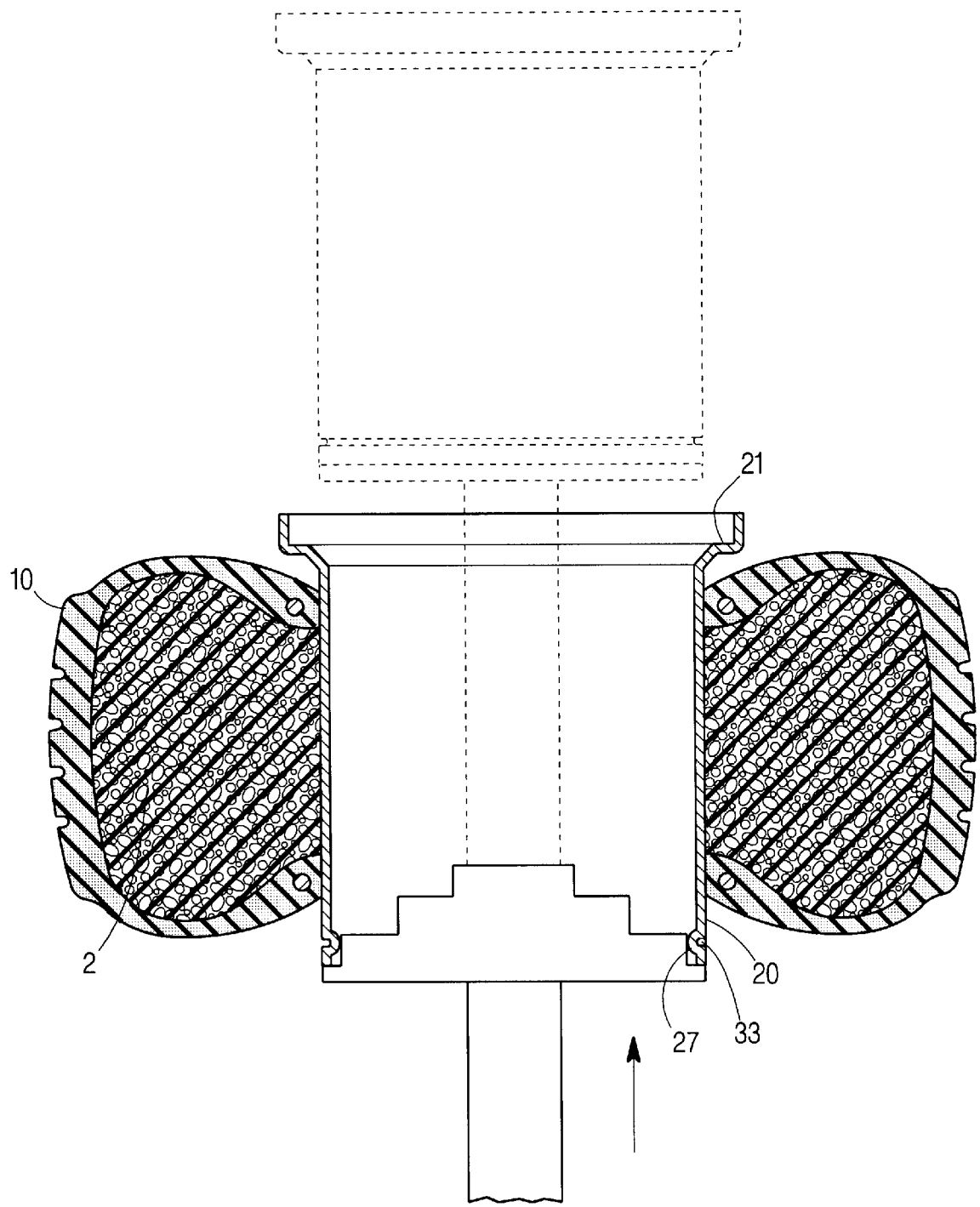
FIG. 5 is a cross sectional view of the cured tire on the curing rim as the curing rim is being pressed through the tire thereby removing the tire from the rim.

As illustrated in FIG. 5, the rim 20 is then pressed off the tire 10, the tire 10 being restrained from movement. This slippage of the tire 10 against the rim 20 is facilitated by a coated surface 32 along the exterior surface 30 of the curing rim 20. Absent this surface 32 the foamable material 2 would have been bonded very securely to the rim 20 and such removal is virtually impossible without damage to the cured foam material 2.

Figure 6:
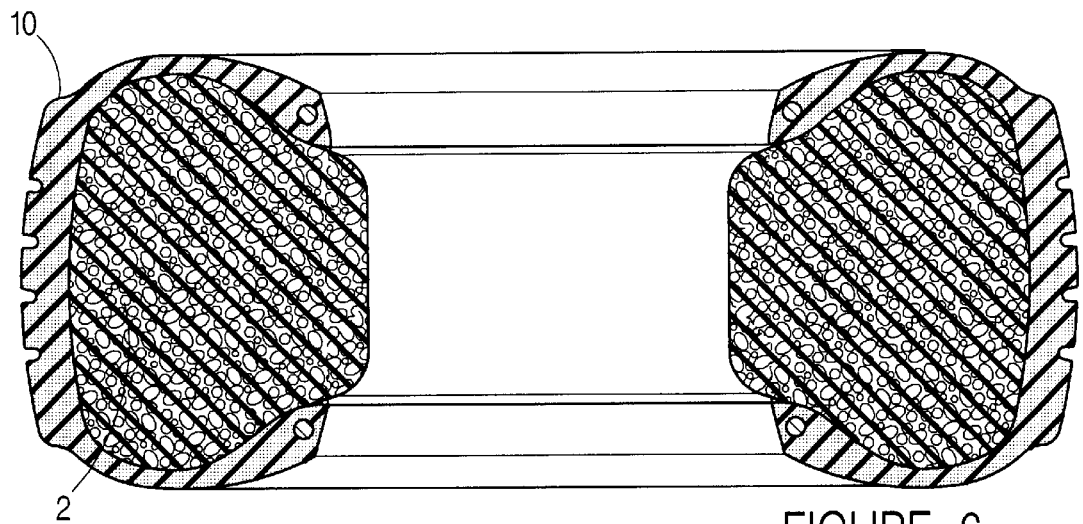
FIG. 6 is a cross sectional view of a foam filled tire after the curing has been removed.

In FIG. 6, the cured tire 10 is shown. The tire 10 is allowed to cool to room temperature. Once the rim 20 is removed, the cured foam material 2 expands freely so that a large portion of the material 2 is protruding towards the interior of the tire 10 beyond the location of the bead 12 of the tire 10. At this point, is wrapped with a protective layer such as a shrink wrap to ensure that dirt and debris and other damaging material do not contaminate the foam filled tire 10.

Once the tire 10 is wrapped, it can then be shipped to the end user and the customer can store these tires without having to store tires cured on separate rims. This greatly improves the users' ability to keep tires in stock and to prevent his equipment from being down any period of time waiting for tires to be foam filled.

Figure 7:
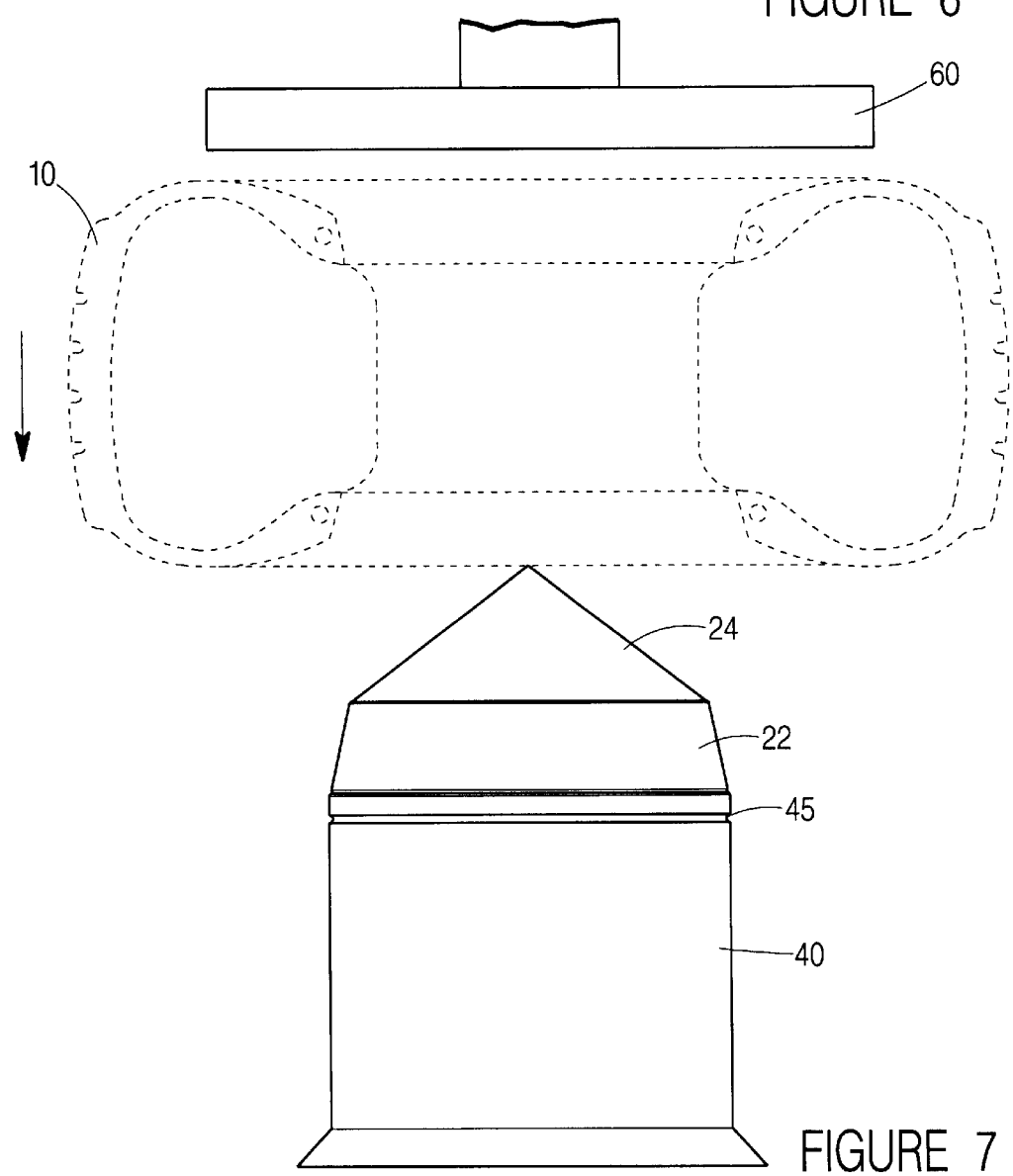
FIG. 7 is an illustration of a cured foam filled tire showing phantom line being prepared to be mounted to a vehicle rim.

Once the tire 10 is ready to be mounted on the vehicle rim 40, the protective shipping layer is removed and the tire 10 is set above an insertion cap 24 and cone 22 as illustrated in FIG. 7. The insertion cap 24 and cone 22 are preferably coated with a fully slip enhancing coating 32. Preferably the coating 32 is baked on to the cap 24 and cone 22 so that it can survive multiple insertions and mountings of such filled tires 10. As illustrated, the insertion cone 22 and insertion cap 24 are placed onto the vehicle rim 40. The vehicle rim 40 has the flange 43 removed prior to insertion and mounting of the tire 10 as illustrated in FIG. 7, the tire 10 is restrained on one side by the fixture 60 and the rim 40 and insertion cone 22 is forced up through the tire 10 as the cap 24 enters into the tire 10, it pushes on the bead portion 12 and helps to direct the expanded foam elastomeric material 2 against the conical surface of the insertion cone 22 the substantially less tapered conical surface of the insertion cone 22 enters into the tire 10 it drives the foam material 2 into the tire cavity 14 compressing into the tire 10.

Figure 8:
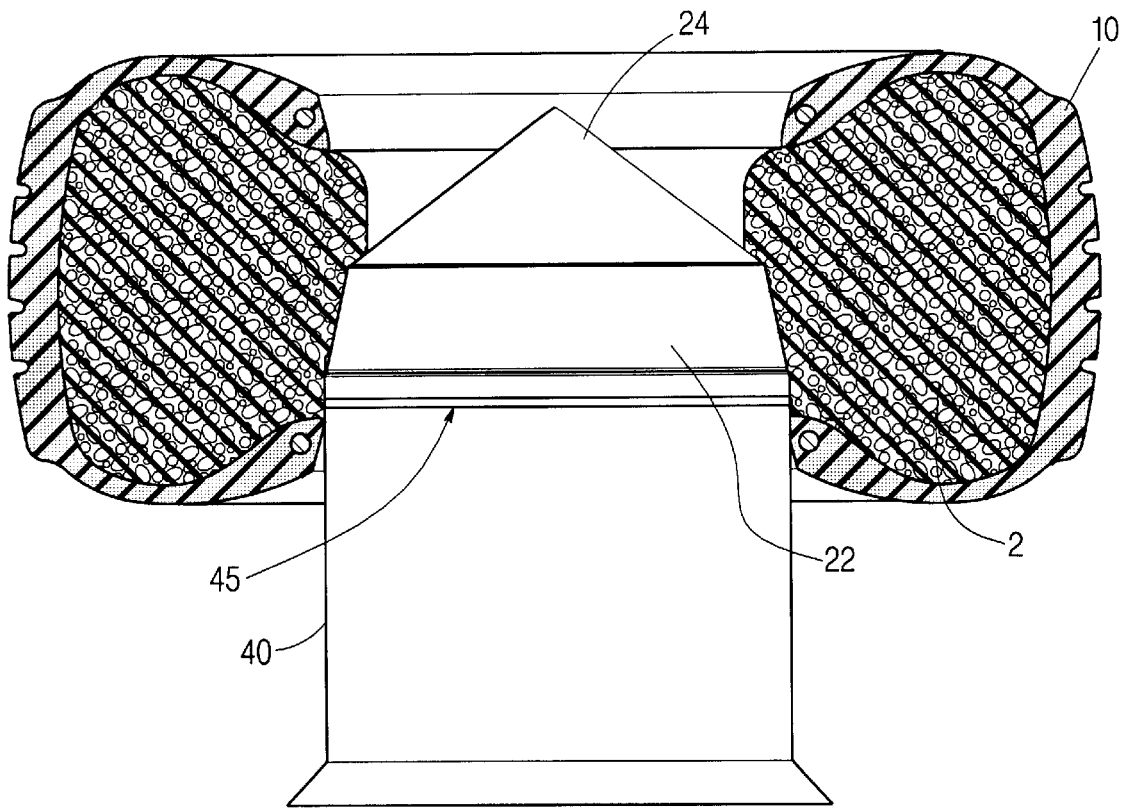
FIG. 8 shows the tire of FIG. 7 being pressed on to a vehicle rim.
Figure 9:
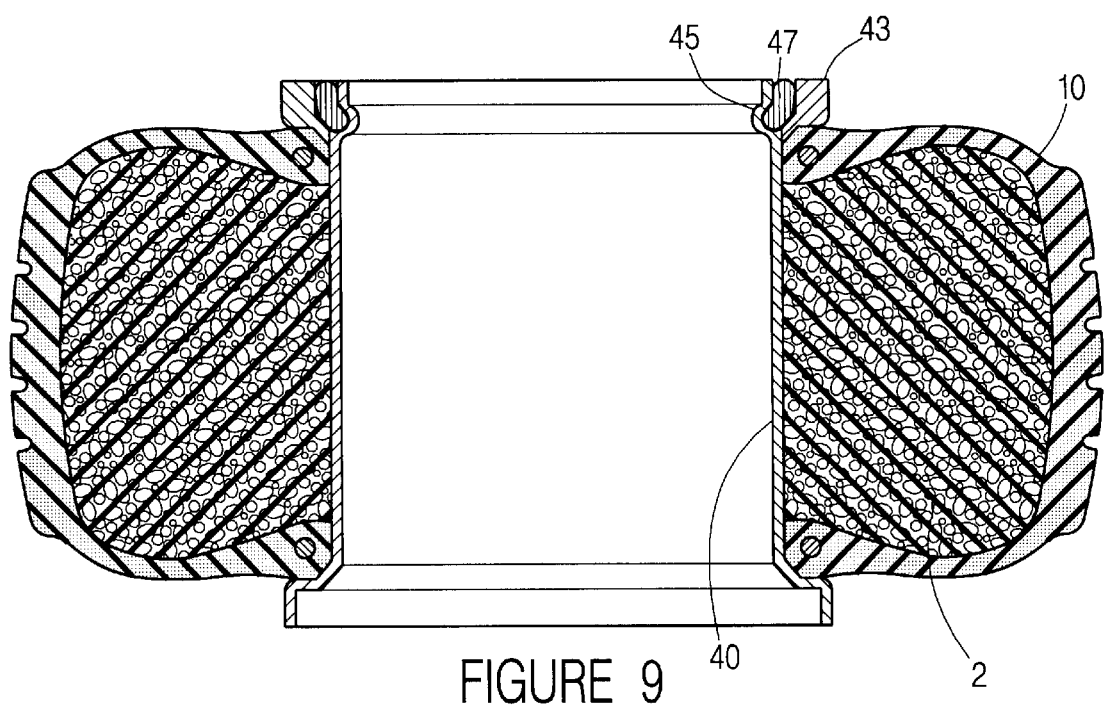
FIG. 9 is a cross sectional view of the foam filled tire mounted to the vehicle rim.

As illustrated in FIG. 8, the tire 10 has the foam compressed into tending the bulge the sidewalls of the tire 10 slightly. The rim 40 is pushed onto the tire 10 such that the tire 10 travels past the groove 45. Once the tire 10 clears the groove portion 45, a lock ring 47 and flange 43 inserted onto the rim 40 completing the assembly of the tire 10 and rim 40.

In some applications the use of the cap 24 is not required and the amount of taper on the cone 22 itself is sufficient to create the compression of the foam material 2 such that the tire 10 can slip onto the rim 40.

Throughout this application the inventors have described the foam material 2 as by way of example Permafoam™.

Permafoam™, which is a commercially available product of the Goodyear Tire and Rubber Company, is only representative of a number of material that are elastomeric expandable foams that could be used in the method. Other curable materials are commercially available that could benefit from this method. They include expandable rubbers and any materials that once cured have a volume that would expand beyond the interior cavity of the tire. What is particularly usefull in the present invention is that these type of materials grip strongly onto the curing rim when they are heated and cured in the conventional processing. It is therefore virtually impossible to remove such curing rims from a cured tire without damaging or tearing the surface structure of the cured foam. The present invention provides a way in which the surface of the cured foam can be easily slipped from the rim 20 without damaging the foam.

The coating 32 on the curing rim 20 preferably is a high temperature material with a sufficiently hard and abrasive resistant finish surface such that it can survive multiple curings. Secondarily, the coated surface should be such that it does not leach into or otherwise contaminate the curing foamable elastomeric material 2. For these reasons, it is believed that the surface 32 should be a high temperature Teflon or other type material that can survive this type of service.

At the vehicle assembly end where the customer will mount the tire onto his rim, the surfaces of the insertion cone 22 and the end cap 24 similarly can have a baked-on for a hard abrasion resistant low friction material 32 to enhance slippage. However, it has been determined that any number of lubricants could be used once the foamable elastomeric material 2 is sufficiently cured without creating any contamination problems for the foam material. Preferably, however, the insertion cones 22 have a baked on surface 32 that will not leach onto the surface of the foam or the tire beads 12, which restrain the tire 10 onto the rim 40. The reason this is significant is that any lubricating surface on the beads 12 and the foam may result in some slippage of the tire 10 around the rim 40. This could increase the abrasion degradation of the foamed material 2 on the interior cavity 14 of the tire 10. The present invention eliminates this possibility when the coated surface 32 is baked on to the surfaces 21, 23 of the cap 24 and insertion cone 22. The rim 40 itself can be nonlubricated and the tire 10 will mount easily without any concern using the method described above.

Foam filled tire means a tire having an interior cavity filled with foamable elastomeric material.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An improved method for expanding and curing foamable elastomeric material which is placed within the cavity of a previously molded tire and mounting the tire onto a wheel rim, the method comprising:

at least partially filling the cavity of the previously molded tire with foamable elastomeric material;

curing the foam filled tire on a curing rim, the curing rim having a reduced friction coated surface;

removing the cured tire from the curing rim by slipping the cured tire off the coated surface of the curing rim;

wrapping the cured tire for storage and shipment with a protective layer;

removing the protective layer;

attaching a reduced friction coated insertion cap onto the wheel rim to form a wheel rim and insertion cap assembly, the insertion cap abutting an end of the wheel rim; and inserting the wheel rim and insertion cap assembly into the foam filled tire by pressing the wheel rim and insertion cap assembly against the cured foam filled tire sufficient to slip the tire onto the rim.

\* \* \* \* \*